(12) United States Patent  
Schoenek

(10) Patent No.: US 7,516,612 B2  
(45) Date of Patent: Apr. 14, 2009

(54) TRANSMISSION PUMP SEAL

(75) Inventor: Norman Schoenek, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 247 days.

(21) Appl. No.: 11/673,775

(22) Filed: Feb. 12, 2007

(65) Prior Publication Data

US 2008/0191422 A1   Aug. 14, 2008

(51) Int. Cl.
*F16J 15/32* (2006.01)
*F16H 41/00* (2006.01)

(52) U.S. Cl. .................. 60/330; 192/3.33; 277/402

(58) Field of Classification Search .................. 60/330, 60/336; 192/3.33; 277/402, 562
See application file for complete search history.

(56) References Cited

U.S. PATENT DOCUMENTS 2,726,556 A * 12/1955 Greenlee .................. 192/3.33
3,230,716 A * 1/1966 Gabriel ...................... 192/3.33
5,720,167 A * 2/1998 Marich ........................ 60/330
6,145,842 A * 11/2000 Zellers et al. ................ 60/330
6,196,551 B1 * 3/2001 Zellers ........................ 60/330

* cited by examiner

*Primary Examiner*—Thomas E Lazo

(57) ABSTRACT

The present invention provides a seal apparatus for a transmission pump. The seal apparatus includes a ring seal configured to seal a gap defined between a transmission pump body and a hub in order to reduce hydraulic fluid leakage. An O-ring is placed around the ring seal such that the O-ring engages the transmission pump body in an axial direction. A retainer ring is disposed around the hub, and a torque converter seal is disposed radially between the transmission pump body and the hub. The torque converter seal applies an axial force which is transferred through the retainer ring in order to compresses the O-ring against the transmission pump body to seal in parallel with the ring seal such that the rate of hydraulic fluid leaking from the transmission pump is reduced. A corresponding method for sealing a transmission pump is also provided.

16 Claims, 2 Drawing Sheets

TRANSMISSION PUMP SEAL

TECHNICAL FIELD

The present invention pertains generally to a method and apparatus providing a transmission pump seal.

BACKGROUND OF THE INVENTION

Conventional transmission pumps are driven by output from the engine in order to transfer hydraulic fluid and thereby meet cooling, lubrication, and pressure requirements of the transmission. The transmission pump includes a pump body which is stationary relative to the transmission housing, and a pump drive gear which is rotatable within the pump body to drive the pump. Rotational forces from the engine may be transferred to the pump drive gear via a torque converter hub. It is known that transmission pumps can leak, and that such leakage diminishes pump efficiency and vehicle fuel economy.

SUMMARY OF THE INVENTION

The present invention provides a seal apparatus for a transmission pump. The seal apparatus includes a ring seal configured to seal a gap defined between a transmission pump body and a hub in order to reduce hydraulic fluid leakage. An O-ring is placed around the ring seal such that the O-ring engages the transmission pump body in an axial direction. A retainer ring configured to axially retain the ring seal and the O-ring is disposed around the hub. A torque converter seal is disposed radially between the transmission pump body and the hub. The torque converter seal applies an axial force which is transferred through the retainer ring in order to compresses the O-ring against the transmission pump body to seal in parallel with the ring seal such that the rate of hydraulic fluid leaking from the transmission pump is reduced.

The seal apparatus may also include a snap ring configured to engage and thereby axially retain the torque converter seal.

The ring seal may be generally cylindrical, or alternatively may define a v-shaped cross-section.

The ring seal may be composed of polytetrafluoroethylene (PTFE), steel, cast iron or any other suitably matched material.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
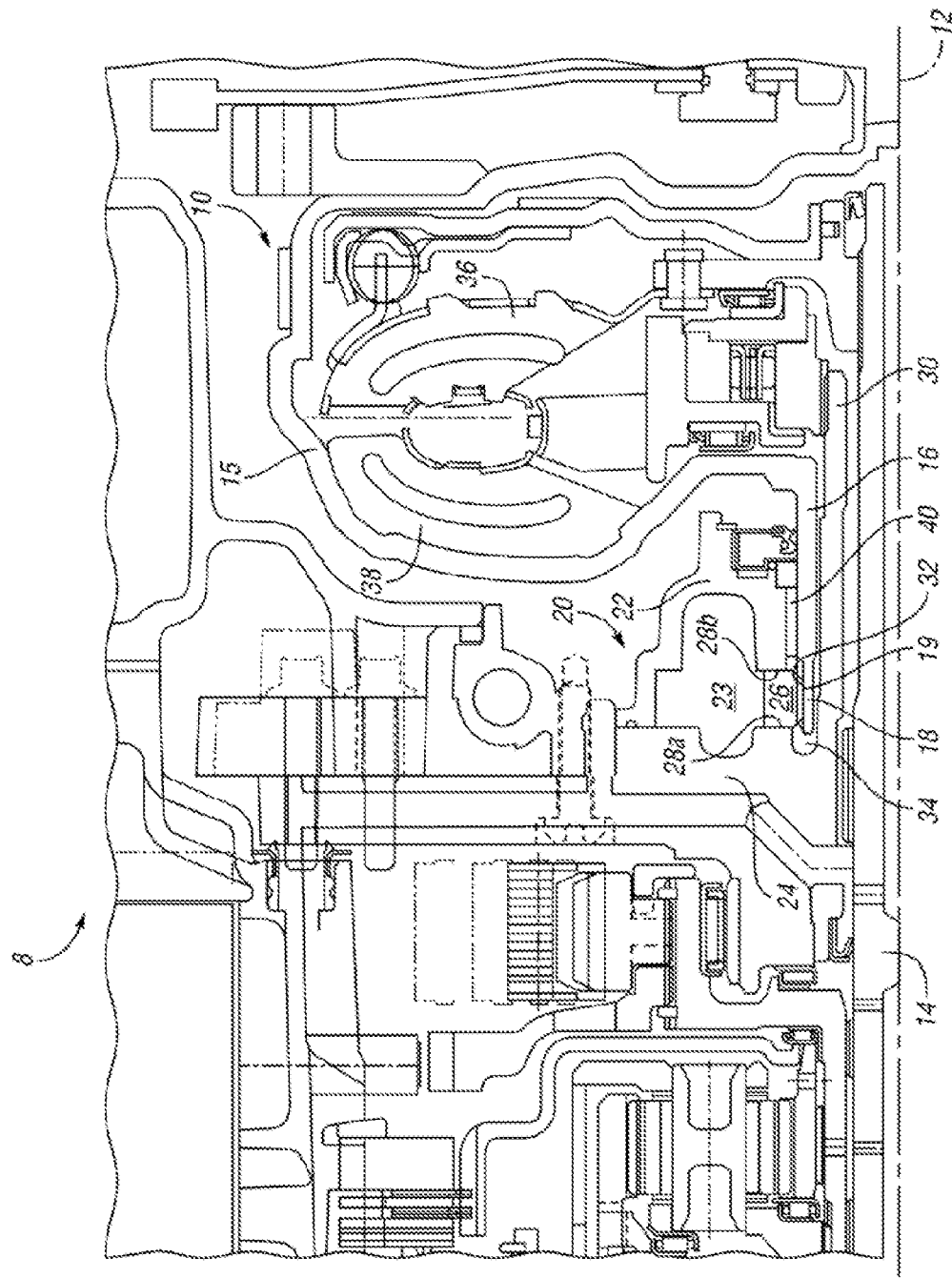
FIG. 1 is a partial cross-sectional view of a transmission assembly operatively connected to a torque converter.

Referring to the drawings, wherein like reference numbers refer to like components, FIG. 1 shows a partial cross-sectional view of a transmission 8 in accordance with the present invention. According to the preferred embodiment shown, the transmission 8 is operatively connected to a torque converter 10; however alternate embodiments may replace the torque converter 10 with a damper assembly (not shown), or other rotating cylindrical shaft member. For illustrative purposes, only the top half of the transmission 8 and the torque converter 10 are shown. It should be appreciated, however, that the transmission 8 and torque converter 10 are generally symmetrical about the center line 12 of the transmission input shaft 14.

The torque converter 10 includes a torque converter housing 15 which is formed to define a generally cylindrical torque converter hub 16. The torque converter hub 16 includes an end portion 18 with multiple flat sections 19 that are adapted to engage and thereby drive a pump drive gear 26 as will be described in detail hereinafter. The torque converter 10 is operatively connected to an engine (not shown) such that the torque converter hub 16 rotates about the center line 12 at engine speed.

The transmission 8 includes a transmission pump 20 configured to transfer hydraulic fluid to meet any cooling, lubrication, and pressure requirements of the transmission 8. The transmission pump 20 includes a pump body 22 and a pump cover 24 defining a pump cavity 23 therebetween; and a pump drive gear 26. Rotation of the pump drive gear 26 powers the pump 20 to pressurize hydraulic fluid within the pump cavity 23. The pump drive gear 26 defines opposing side portions 28a, 28b, and generally flat engagement portions 32. The engagement portions 32 of the drive gear 26 are engaged by the flat sections 19 of the torque converter hub 16 such that the rotation of the torque converter hub 16 is imparted to the drive gear 26 thereby powering the pump 20. While the drive gear 26 is preferably mechanically coupled to the torque converter hub 16 via the geometry of the flat engagement portions 32 and the flat sections 19, other conventional coupling geometries such as, for example, a splined interface may be envisioned.

A bushing 40 is configured to radially support the pump body 22 on the torque converter hub 16 such that the torque converter hub 16 is rotatable. The bushing 40 of the present invention is primarily configured to bear the weight of the torque converter 10, torque converter imbalance loads, and the radial loads generated at the pump drive gear 26, and therefore the bushing 40 differs from more conventional designs wherein similarly disposed bushings serve both load bearing and sealing functions. The bushing 40 is preferably press fit into engagement with the pump body 22 so that there is no relative rotation therebetween. The bushing 40 is generally cylindrical and defines opposing end portions 42, 44 (shown in FIG. 2).

The transmission 8 includes a stator shaft 30 at least partially circumscribed by the torque converter hub 16 and which is operatively connected to both the pump cover 24 and the torque converter 10. The stator shaft 30 is shown as being integral with the pump cover 24, however, these components may alternatively be separate and connected together in any known manner. A chamber 34 is at least partially defined by the pump cover 24 and the stator shaft 30. The chamber 34 fills with pressurized hydraulic fluid when the torque converter 10 is operating in a "lock-up mode". As is known in the art, torque converter "lock-up mode" is a mode wherein the torque converter turbine 36 and the torque converter pump 38 are coupled and rotate together in order to improve efficiency.

Figure 2:
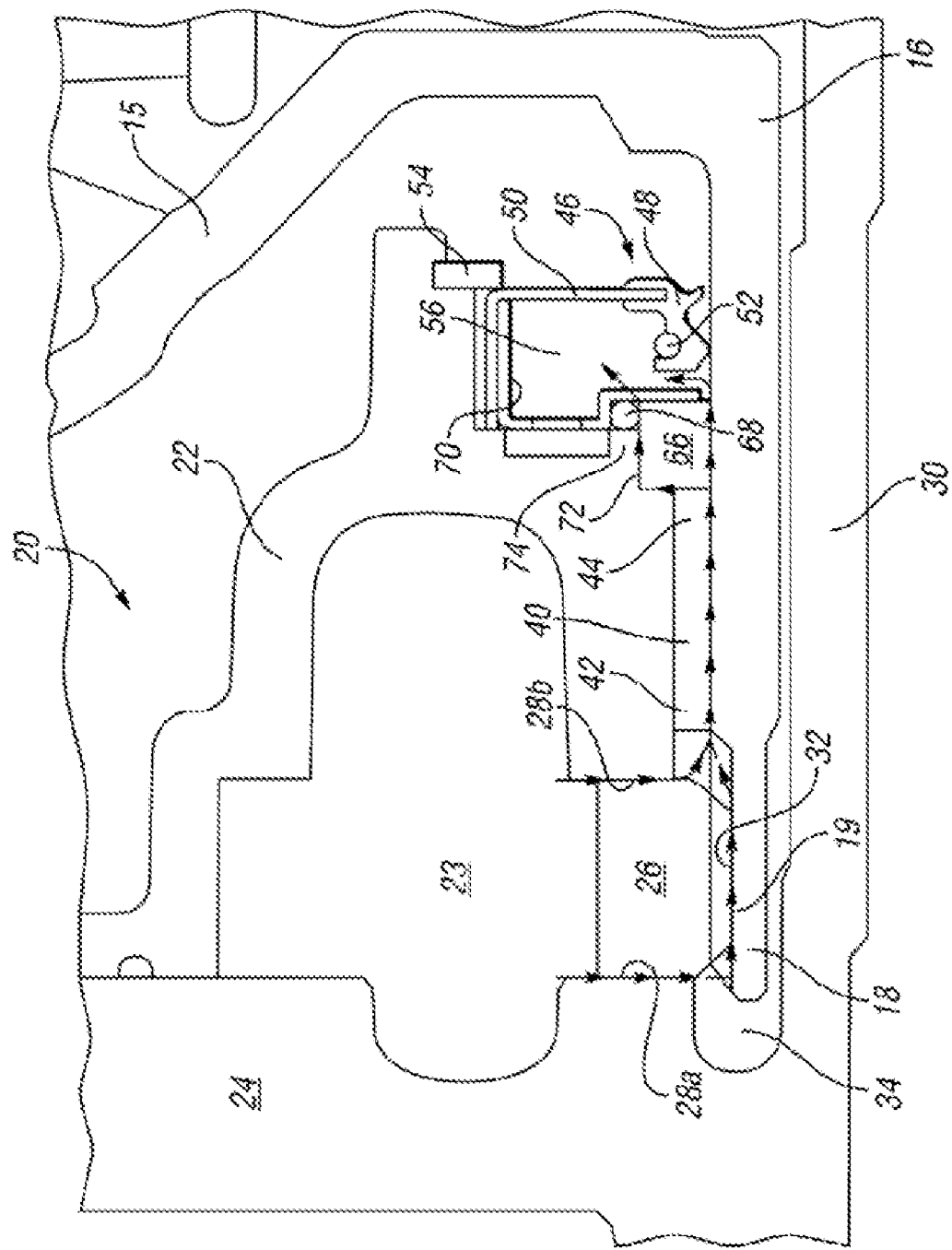
FIG. 2 is a more detailed cross-sectional view of a transmission pump.

Referring to FIG. 2, the pump 20 is shown in more detail. Hydraulic fluid from the pump cavity 23 can leak along the opposing side portions 28a, 28b of the pump drive gear 26, and between the bushing 40 and the torque converter hub 16 as shown with arrows representing leaked hydraulic fluid. Additionally, when the torque converter 10 (shown in FIG. 1) is in lock-up mode, pressurized hydraulic fluid in the chamber 34 can leak between the bushing 40 and the torque converter hub 16. A torque converter seal 46 is provided to catch and thereby preserve the hydraulic fluid which leaks past the bushing 40. The torque converter seal 46 generally includes an elastomeric seal member 48 integrally molded onto a metallic carrier 50. A garter spring 52 applies radial pressure bringing the seal member 48 into engagement with the torque converter hub 16 to form a seal at the interface therebetween. A snap ring 54 engages the metallic carrier 50 to axially retain the torque converter seal 46.

The pressurized hydraulic fluid which leaks past the bushing 40 and is then caught by the torque converter seal 46 accumulates in a cavity 56. The pressurized hydraulic fluid in the cavity 56 is ultimately transferred to a low-pressure sump or reservoir (not shown). It should be appreciated that the energy expended to increase the pressure of the hydraulic fluid which leaks past the bushing 40 is wasted and that such leakage is therefore inefficient. Accordingly, the present invention incorporates a ring seal 66, an O-ring 68 and a vented retainer ring 70, described in detail hereinafter, in order to reduce the amount of pressurized hydraulic fluid leakage and thereby improve the efficiency of the pump 20. It should be appreciated that the O-ring 68 may alternatively be replaced with any elastomeric member which is compressible and circumferentially disposed and may, for example, be integrally bonded onto the vented retainer ring 70 to form a single component.

The pump body 22 defines a seal recess 72 adapted to position and retain the ring seal 66. The ring seal 66 circumscribes a portion of the torque converter hub 16, engages the end portion 44 of the bushing 40, and is disposed at least partially within the seal recess 72. Radial clearance between the seal recess 72 and the ring seal 66, and axial clearance between the end portion 44 and the ring seal 66 are required such that the ring seal 66 generally floats in both the radial and axial directions. The ring seal 66 is not radially constrained by the pump body 22 other than when the O-ring 68 is compressed in an axial direction. The composition of the ring seal 66 can be selected to produce a given leakage flow rate and may include, for example, steel, iron, or plastic. According to the preferred embodiment of the present invention, the ring seal 66 is composed of polytetrafluoroethylene (PTFE). The ring seal 66 can be configured to define the generally cylindrical shape shown in FIG. 2, or alternatively can define a V-shaped cross-section with a metered orifice (not shown).

A portion of the pump body 22 which defines the seal recess 72 also forms a protrusion 74 extending in an axial direction toward the torque converter 10 (shown in FIG. 1). The ring seal 66 is radially retained between the protrusion 74 and the torque converter hub 16. The pressurized hydraulic fluid which leaks past the bushing 40 follows either a first flow path between the protrusion 74 and the ring seal 66, or a second flow path between the ring seal 66 and the torque converter hub 16, as shown with arrows representing leaked hydraulic fluid. It has been observed that the implementation of the ring seal 66 reduces the amount of pressurized hydraulic fluid leakage from the pump 20 as compared to conventional designs which rely on a bushing to seal.

The rate of pressurized hydraulic fluid leakage can be further reduced with the addition of the O-ring 68 which is configured to restrict the flow path defined between the protrusion 74 and the ring seal 66. The O-ring 68 is disposed radially around the ring seal 66, and is axially positioned to engage the protrusion 74. Therefore, the O-ring 68 is configured to form a first seal at the interface between the O-ring 68 and the ring seal 66; a second seal at the interface between the O-ring 68 and the protrusion 74; and a third seal at the interfaces between the O-ring 68 and the vented retainer ring 70.

The vented retainer ring 70 is disposed radially around the torque converter hub 16, and is configured to axially retain the ring seal 66 and the O-ring 68. Additionally, the vented retainer ring 70 applies an axial force tending to compress the O-ring 68 against the protrusion 74. More precisely, during installation the metallic carrier 50 of the torque converter seal 46 is forcibly pushed into engagement with the vented retainer ring 70, and such forcible engagement is maintained with the addition of the snap ring 54. The installation of the metallic carrier 50 in this manner applies an axial force to the vented retainer ring 70, and the vented retainer ring 70 transfers this force to the O-ring 68. Advantageously, the compression of the O-ring 68 against the protrusion 74 forms a tighter seal therebetween. As the O-ring 68 is compressed against the protrusion 74, the O-ring 68 is deformed to increase the area of contact and thereby accommodate for stack variations. Additionally, hydraulic pressure between bushing end 44 and pump seal recess 72 pushes the ring seal 66 into the vented retainer ring 70 to form an axial seal, and the PTFE ring seal 66 is radially compressed to seal against the torque converter hub 16.

While the best modes for carrying out the invention have been described in detail, those familiar with the art to which this invention relates will recognize various alternative designs and embodiments for practicing the invention within the scope of the appended claims.

The invention claimed is:

1. A seal apparatus for a transmission pump comprising:
    a ring seal disposed radially between a transmission pump body and a hub;
    an elastomeric member circumscribing the ring seal, the elastomeric member being positioned to engage the transmission pump body in an axial direction; and
    a retainer disposed radially around the hub such that the retainer applies an axial force tending to compress the elastomeric member against the transmission pump body, said retainer being configured to axially retain the ring seal and the elastomeric member;
    wherein the amount of hydraulic fluid that leaks from the transmission pump is minimized by the ring seal and the elastomeric member.

2. The seal apparatus of claim 1, wherein the elastomeric member is an O-ring.

3. The seal apparatus of claim 1, further comprising a torque converter seal disposed radially between the transmission pump body and the hub, the torque converter seal being configured to catch hydraulic fluid which leaks from the transmission pump.

4. The seal apparatus of claim 3, further comprising a snap ring configured to engage and thereby axially retain the torque converter seal.

5. The seal apparatus of claim 1, wherein the hub is a torque converter hub configured to drive the transmission pump.

6. The seal apparatus of claim 1, wherein the hub is a damper hub configured to drive the transmission pump.

7. The seal apparatus of claim 1, wherein the ring seal is generally cylindrical.

8. The seal apparatus of claim 1, wherein the ring seal defines a V-shaped cross-section.

9. The seal apparatus of claim 1, wherein the ring seal is composed of polytetrafluoroethylene.

10. A seal apparatus for a transmission pump comprising:
    a ring seal configured to at least partially seal a gap defined between a transmission pump body and a hub in order to reduce transmission pump leakage;

an O-ring circumscribing the ring seal, the O-ring being positioned to engage the transmission pump body in an axial direction;

a retainer ring disposed radially around the hub, said retainer ring being configured to axially retain the ring seal and the O-ring; and a torque converter seal disposed radially between the transmission pump body and the hub, the torque converter seal being configured to catch hydraulic fluid which leaks from the transmission pump;

wherein the torque converter seal applies an axial force which is transferred through the retainer ring in order to compresses the O-ring against the transmission pump body to seal in parallel with the ring seal such that the rate of hydraulic fluid leaking from the transmission pump is minimized.

11. The seal apparatus of claim 10, further comprising a snap ring configured to engage and thereby axially retain the torque converter seal.

12. The seal apparatus of claim 11, wherein the ring seal is generally cylindrical.

13. The seal apparatus of claim 11, wherein the ring seal defines a V-shaped cross-section.

14. The seal apparatus of claim 11, wherein the ring seal is composed of polytetrafluoroethylene.

15. A method for sealing a transmission pump comprising:

disposing a ring seal between a transmission pump body and a hub;

installing an O-ring around the ring seal such that the O-ring engages the transmission pump body in an axial direction;

positioning a retainer ring around the hub and into engagement with the O-ring; and installing a torque converter seal around the hub and into engagement with the retainer ring;

wherein said installing the torque converter seal applies an axial force which is transferred through the retainer ring and compresses the O-ring against the transmission pump body to form a seal such that the rate of hydraulic fluid leaking from the transmission pump is minimized.

16. The method of claim 15, further comprising installing a snap ring onto the transmission pump body such that the torque converter seal is axially retained.

* * * * *